Dec. 6, 1949 R. G. LE TOURNEAU 2,490,310
SELF-LOADING SCRAPER
Filed May 28, 1945 3 Sheets-Sheet 1
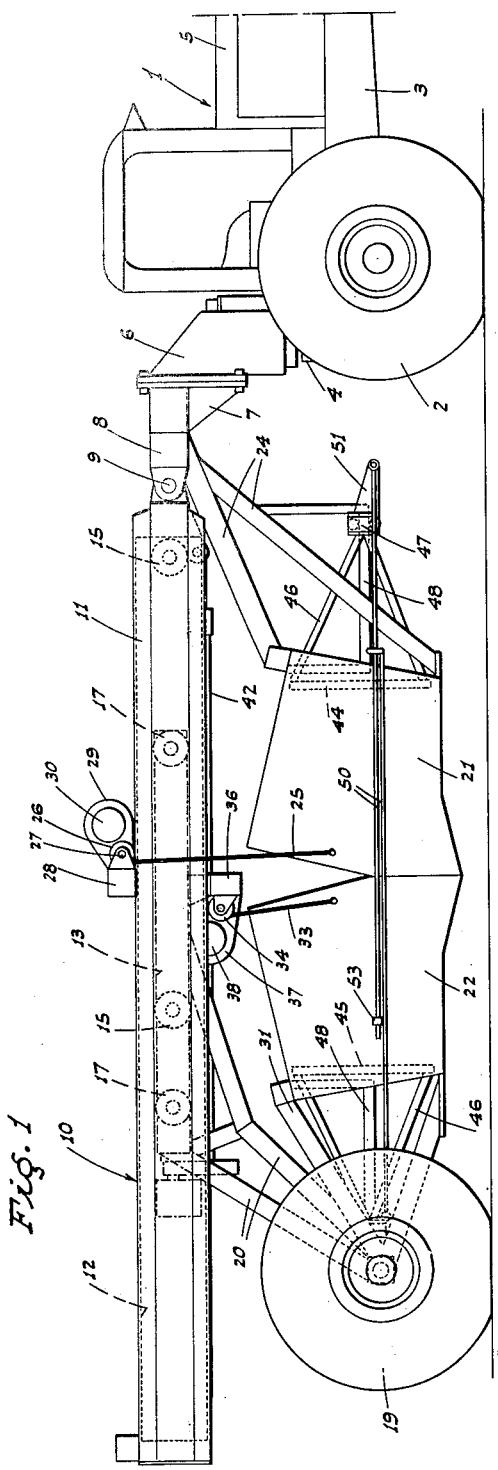
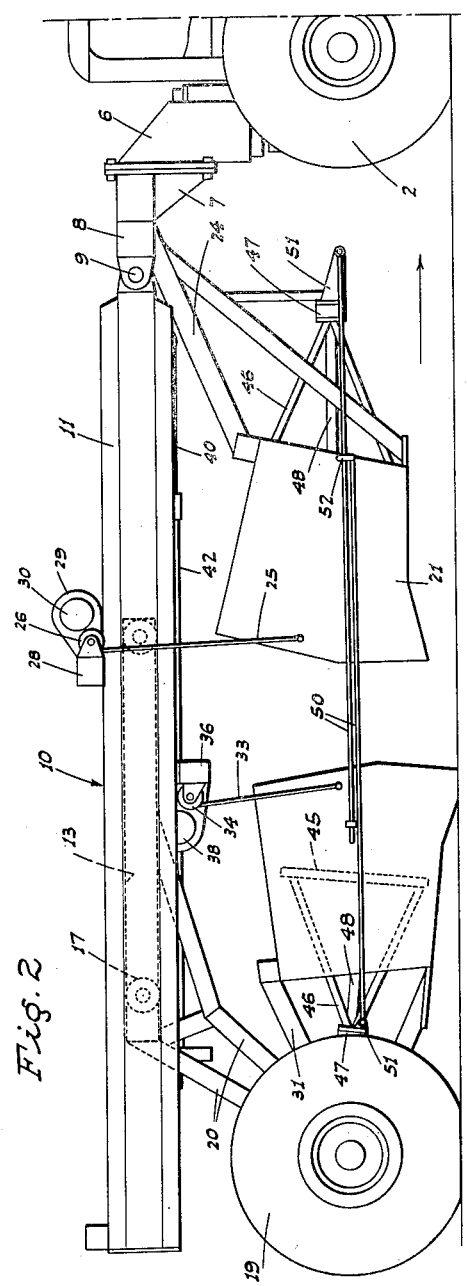
INVENTOR
R. G. LeTourneau
BY
ATTORNEYS

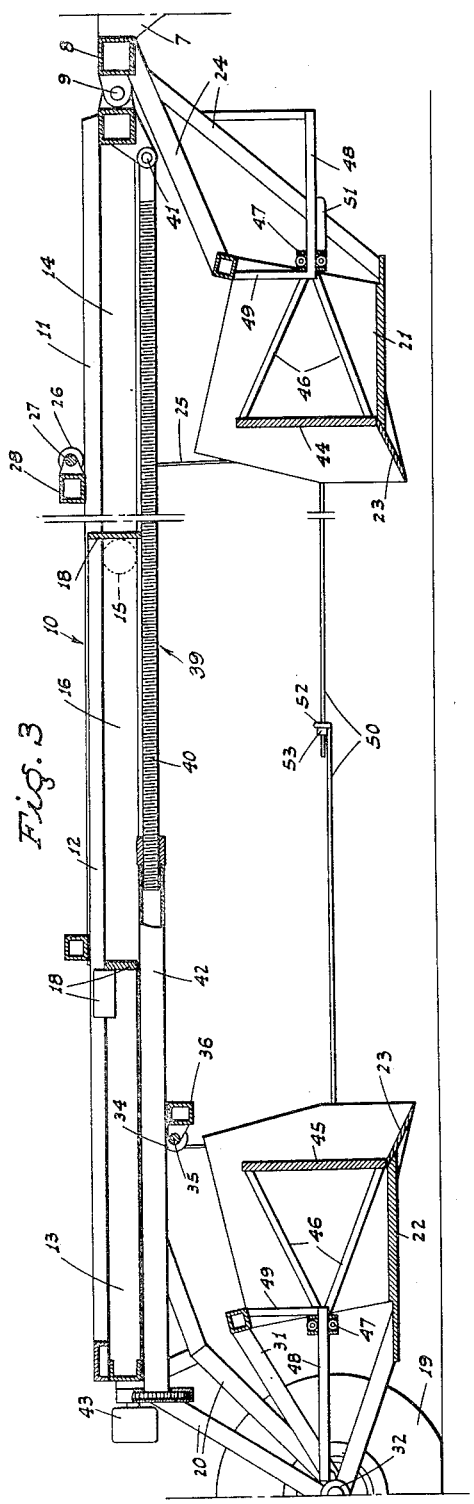
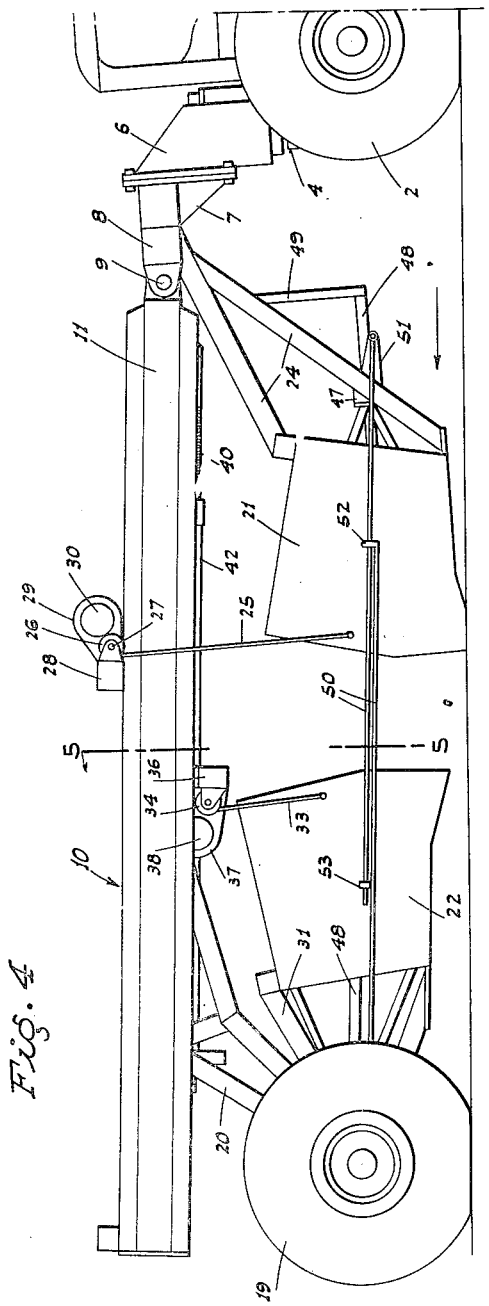

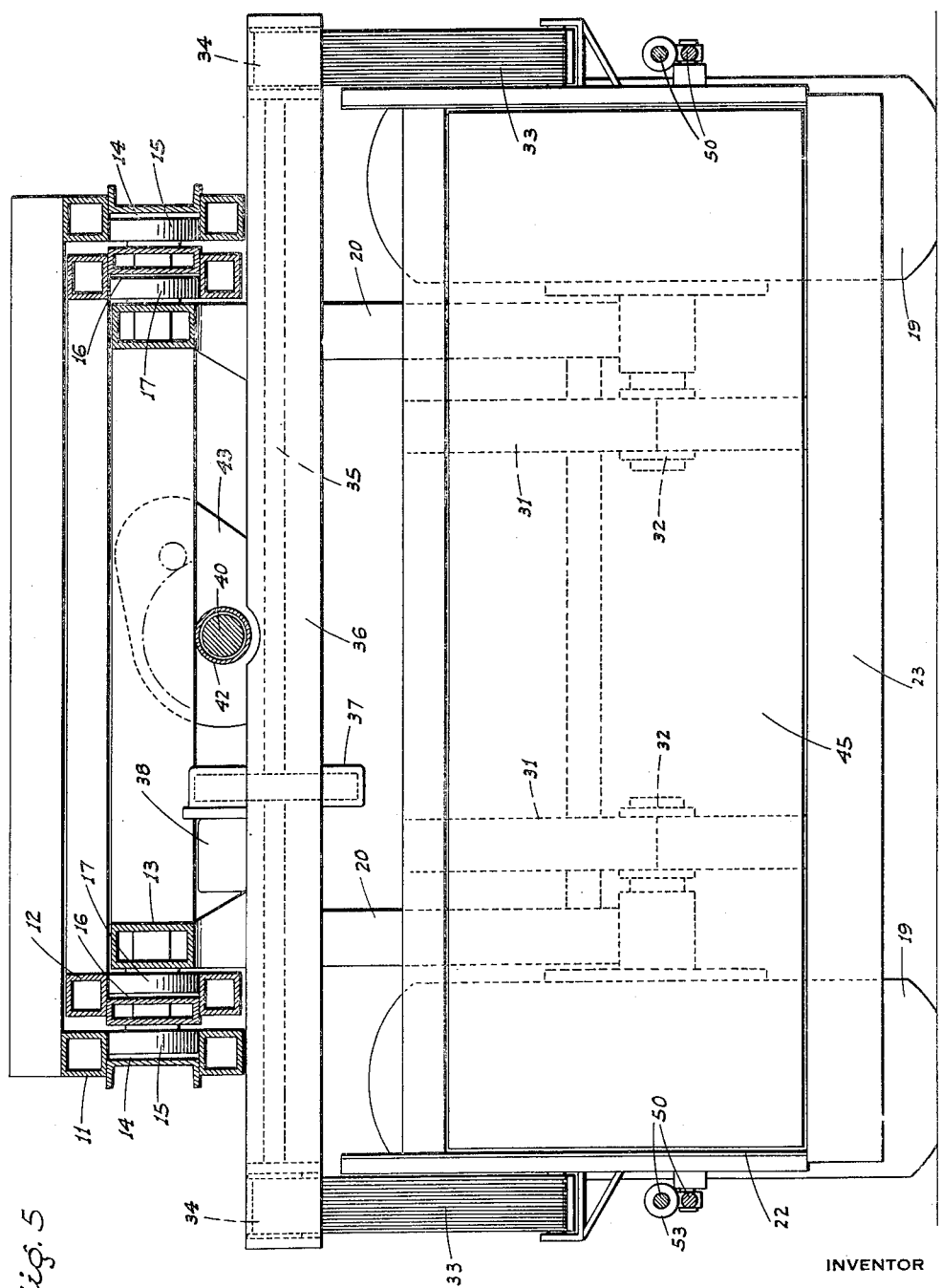

Patented Dec. 6, 1949

2,490,310

UNITED STATES PATENT OFFICE 2,490,310

SELF-LOADING SCRAPER

Robert G. LeTourneau, Peoria, Ill., assignor to R. G. LeTourneau, Inc., Stockton, Calif., a corporation of California Application May 28, 1945, Serial No. 596,381

17 Claims. (Cl. 37—126)

This invention relates in general to earth moving equipment.

In particular the invention is directed to, and it is an object to provide, an improved earth carrying scraper which includes its own power plant for motive and loading purposes.

Another object of the present invention is to provide an earth carrying scraper, as above, which is self-loading; i. e. is so constructed and powered that the implement can dig earth and load to capacity without the necessity of using a separate assisting implement in pushing or pulling relation thereto during the loading operation.

An additional object of this invention is to provide an earth carrying scraper which is designed to load, while standing in one position, by powered movement of the bowls independently of the wheels; or can load by wheel traction while moving forwardly or rearwardly; or can load by simultaneous use of said powered movement of the bowls and wheel traction; all as conditions may require, and selectively.

A further object of the invention is to provide an earth carrying scraper, as in the preceding paragraph, which includes a power actuated, longitudinally extending telescopic frame assembly, and a pair of cooperating earth digging and carrying bowls mounted end to end lengthwise of the implement and in such relation to the frame assembly that when the latter extends or contracts, the bowls separate or approach, respectively, relative to each other; said bowls being supported for independent vertical adjustment between loading and carrying positions, and each bowl including a corresponding end gate therein operative to automatically discharge the load therefrom upon predetermined separation of said bowls.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation, somewhat diagrammatic, of the implement showing the frame assembly contracted and the bowls engaged in raised earth carrying position.

Figure 2 is a similar view but discloses the frame assembly partly extended, and with the rear bowl in lowered digging position.

Figure 3 is a fragmentary longitudinal sectional elevation of the implement showing the frame assembly fully extended, with the bowls in raised position and with the end gates in fully advanced earth discharging position.

Figure 4 is a view similar to Fig. 2 but discloses the front bowl in lowered digging position.

Figure 5 is an enlarged cross section on line 5—5 of Fig. 4.

Referring now more particularly to the characters of reference on the drawings, the implement comprises a two-wheel tractor, indicated generally at 1, which tractor is of the "Tournapull" type, and includes a transversely spaced pair of ground engaging drive wheels 2, and an engine support 3 which projects forwardly from a transmission housing, indicated in part at 4, and which extends between the wheels 2. The engine (not shown) is enclosed within a hood 5.

At the rear end, and upstanding from the deck formed by the top of the transmission housing 4, the tractor includes a power steering mechanism, indicated generally at 6, and which is preferably of electrically actuated type, as shown in copending application, Serial No. 569,815, filed December 26, 1944 and now Patent No. 2,400,868 granted May 28, 1946.

The power steering mechanism is connected, at the back thereof, by means of a removable attachment bracket 7, to a horizontal, rigid cross beam 8. At transversely spaced points the cross beam 8 is secured by pivotal connections 9 in relatively vertically swingable relation to a telescopic frame assembly, indicated generally at 10; said frame assembly extending lengthwise of the direction of travel, and being substantially horizontal.

The telescopic frame assembly is substantially rectangular in plan and includes a front frame section 11, an intermediate frame section 12, and a rear frame section 13; all likewise rectangular in plan. The cross beam 8 is in effect a part of frame section 11.

The front frame section 11 includes, in the side beams thereof, longitudinally extending parallel and inwardly facing channels 14 in which longitudinally spaced rollers 15 on the frame section 12 ride. Similarly, the intermediate frame section 12 includes, in the side beams thereof, longitudinally extending parallel and inwardly facing channels 16 in which longitudinally spaced rollers on the rear frame section 13 ride. It will thus be seen that the three frame sections are capable of telescopic movement relative to each other lengthwise of the implement, whereby when contracted the frame assembly is not of undue length, but is capable of relatively great extension. Between the intermediate and rear frame sections there is provided stop or abutment means 18 to limit relative movement between the intermediate and rear frame sections, as is necessary.

Adjacent and below the rear end portion of the telescopic frame assembly the implement includes a transversely spaced pair of ground engaging wheels 19, which are supported from the rear frame section 13 by a rigid leg structure 20. The pair of wheels 19, together with the pair of wheels 2, are provided with brakes, which brakes can be applied selectively by the tractor operator; i. e. the brakes of the rear wheels 19 can be set, or the brakes of the front wheels 2 can be set. These brakes are conventional and are not shown.

Beneath the telescopic frame assembly and intermediate the front and rear wheels of the implement the latter includes a pair of earth carrying bowls disposed in end to end relation lengthwise of said implement; the front bowl being shown at 21, and the rear bowl being shown at 22. The bowls 21 and 22 are open at adjacent ends, and which ends are each fitted at the lower edge with a transversely extending digging blade 23.

The front bowl 21 is fixed at its forward end in connection with a rigid, upwardly and forwardly inclined supporting structure 24, which is rigidly mounted at its upper end on the cross beam 8. Adjacent its rear or open end the front bowl 21 is suspended from opposite sides by flat cables 25 which extend upwardly to connection with drums 26 on a cross shaft 27 journaled in connection with a cross beam 28 of the front frame 11. The cross shaft 27 is connected with an electrically driven, normally braked reversible power unit 29 mounted on the front frame section 11 and including an electric motor 30. The power unit of course includes a reduction gear assembly, and when said unit is operated in one direction or the other, the front bowl 21 will be raised or lowered about connections 9 as the pivotal point.

The rear bowl 22 is fixed at its rear end with a rigid, rearwardly extending supporting structure 31 which is coupled at its rear end to the lower end of the leg structure 20, as at 32, for vertical swinging movement of said rear bowl 22 about the axis of wheels 19. Adjacent its forward end and on opposite sides the rear bowl 22 is suspended by flat cables 33, which extend upwardly to connection with drums 34 on a cross shaft 35 journaled on a cross beam 36 included in the rear frame section 13 at the bottom thereof. The cross shaft 35 is actuated by a normally braked, reversibly driven power unit 37 mounted on said rear frame section 13, and including a motor 38. The power unit 37 is of the same type as the power unit 29, and both of said units are connected by an electrical circuit (not shown) for selective operation by the tractor operator.

The telescopic frame assembly 10 is extended or contracted, selectively, by means of an elongated screw unit 39 which extends full length of said frame assembly 10 beneath the latter; said screw unit including a screw 40 connected at its forward end to the corresponding end of the front frame section 11, as at 41. The screw unit 39 also includes a driven rotary sleeve 42, into which the screw 40 threads. The rotary sleeve 42 is mounted in connection with the rear frame section 13, and is reversibly driven by means of an electrically actuated power unit 43 mounted on said rear frame section at its rear end. With operation of the power unit 43 in one direction or the other the screw unit 39 will extend or contract with resultant extension or contraction of the telescopic frame assembly 10. The power unit 43 includes reduction gearing whereby to impart a relatively great force to the screw unit 39.

The electricity for operation of the power units 29, 37, and 43 is supplied by a heavy-duty generator mounted within the hood 5 of the tractor 1 and driven by the tractor engine.

The bowls 21 and 22 are provided therein with relatively movable, earth push-out gates 44 and 45, which gates are disposed in the front and rear ends, respectively, of said bowls when the latter are in closed position, as in Fig. 1. The end gates 44 and 45 are supported, for sliding movement relative to and within the bowls and lengthwise of the implement, by means of oppositely projecting supporting structures 46, fixed at their outer ends to roller carriages 47 riding, top and bottom, on longitudinal guideways 48 rigidly connected to corresponding ones of the bowl supporting structures 24 and 31. Upstanding members 49 limit movement of the carriages 47 in a direction to prevent the end gates 44 from escaping from the open, loading ends of the corresponding bowls.

When the bowls are in closed position the endgates are retracted in said bowls, as shown in dotted lines in Fig. 1, whereas when said bowls are fully separated, by full extension of the telescopic frame assembly 10, as shown in Fig. 3, said gates are advanced to full dumping position adjacent the digging blades 23, as shown in Fig. 3. This advancing of the end gates 44 and 45 in the respective bowls is accomplished as follows:

A pair of longitudinally extending control rods 50 extend alongside of the bowls on each side thereof and are connected at opposite ends with corresponding carriages 47 by means of lateral arms, one of which is indicated at 51. Adjacent end portions of the rods 50 lap each other, and are connected in operative relation by an eye 52 on the end of one rod surrounding the other rod, and a stop 53 on the end of said other rod.

By reason of the above arrangement, it will be evident that when the bowls are in a full closed position, as in Fig. 1, or partially separated, as in Fig. 4, the end gates 44 and 45 remain retracted. However, as the telescopic frame assembly is fully extended, and the bowls 21 and 22 approach full separation, the stops 53 engage the eyes 52 to limit further separating movement of the end gates 44 and 45. Thus, as the bowls move apart to a greater extent, the end gates 44 and 45 relatively advance in said bowls to the full discharging position of Fig. 3. The end gates 44 and 45 are returned to their starting or normally retracted position as the bowls are loaded, the load of dirt pushing said gates to retracted position as such load enters the bowl. The end gate 45 is shown in partially retracted position in dotted lines in Fig. 2, and to which retracted position it has been urged by the load as it enters the rear bowl 22.

*Operation*

The above described implement functions in the following manner:

For self-loading of the scraper without use of wheel traction, and when the implement is standing in one position, the power unit 43 is actuated to cause extension of the screw unit 39 and subsequent extension of the telescopic frame assembly 10. This separates the bowls 21 and 22 to a desired extent, whereupon one or both of said bowls is lowered into digging position. The digging position of the rear bowl 22 is shown in Fig. 2, while the digging position of the front bowl 21 is shown in Fig. 4. When one or both of said bowls are lowered into digging position, the power unit 43 is actuated in a direction to cause contraction of the screw unit 39 and telescopic frame assembly 10. This causes the bowls 21 and 22 to move in approaching relation to each other, and the lowered bowl or bowls to dig and load earth thereinto. If both bowls are in lowered digging position, a clamshell-like action is accomplished. When the bowls reach engagement or fully closed position they are elevated to the carrying position of Fig. 1. It is understood of course that the lowering and raising of the bowls is accomplished through the medium of the power units 29 and 37. To dump the bowls 21 and 22, the telescopic frame assembly 10 is extended in the manner previously described, and to an extent to cause the rods 50 to relatively advance the end gates 44 and 45 through said bowls to force the load out thereof onto the ground. The depth to which the discharged load is spread on the ground as it spills from the bowls is adjusted by regulating the height of the blades 23 above ground level.

To load the implement by tractor-wheel traction, as distinguished from self-loading through the medium of the screw unit 39, as previously described, the bowls 21 and 22 are first separated by partial extension of the telescopic frame assembly 10 by said screw unit 39. Thereafter the bowls are loaded separately and in successive order by first lowering one bowl and advancing the implement in a direction to load said bowl, and then after raising said one bowl to carrying position, lowering the other bowl to digging position and moving the implement in an opposite direction. In this way both bowls can be loaded wholly by wheel traction as the implement moves along the ground.

It is also possible that under certain working conditions, the bowls can be loaded simultaneously by powered movement toward each other under the influence of the screw unit 39, and simultaneous movement of said bowls along the ground under the influence of tractor-wheel traction. For example, the rear bowl 22 could be set to a substantial digging depth, and the front bowl 21 set to a lesser digging depth, whereby the bowls could move forwardly with the implement. There would thus be imparted to the rear bowl an accumulative digging force, as resultant from contraction of the screw unit 39 and the traction of wheels 2. Simultaneously, the bowls would approach each other so that the front bowl 21 would, in effect, pick up and load all earth heaped between the bowls by reason of the digging and loading action of the rear bowl.

As a further example of the several ways in which the implement may be loaded, the rear bowl 22 may be lowered to digging position, with the front bowl 21 remaining raised, and the implement advanced by tractor-wheel traction to load said rear bowl. The implement is then stopped with the rear bowl 22 down, and the front bowl 21 lowered to digging position. Then with the brakes of the rear wheels 19 set, but the brakes of the front wheels 2 released, the screw unit 39 is run in a direction to contract the telescopic frame assembly 10. As the rear wheels 19 cannot move forwardly, the action of the screw unit 39 is to cause rearward digging movement of the bowl 21 to load the same, and when such bowl is loaded it is then raised to carrying position along with bowl 22.

The above descriptions of the manner of use of the implement are merely illustrative, as it will be recognized that the front and rear bowls may be loaded in different order to each other than described, and selectively by the self-loading mechanism including power screw unit 39, or by wheel traction, or combinations thereof.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. An earth carrying scraper comprising a frame including a plurality of relatively longitudinally movable frame sections, a pair of end loading earth carrying bowls, means mounting the bowls in connection with the frame for longitudinal movement with different ones of the frame sections, and power actuated means arranged to cause forceful relative movement of said different frame sections; said bowls each including a digging blade extending thereacross at one end at the bottom, and each bowl being selectively vertically adjustable between a lowered digging and loading position, and a raised carrying position independently of any vertical movement of the other bowl.

2. An earth carrying scraper comprising a frame including a plurality of relatively longitudinally movable frame sections, a pair of end loading earth carrying bowls, means mounting the bowls in connection with the frame for longitudinal movement with different ones of the frame sections, and power actuated means arranged to cause forceful relative movement of said different frame sections; the bowls being adapted to load from adjacent ends and having digging blades extending thereacross at the bottom at said ends, each bowl being selectively vertically adjustable between a lowered digging position and a raised carrying position independently of any vertical movement of the other bowl.

3. An earth carrying scraper comprising a frame including a plurality of telescopic frame sections, power actuated means connecting said sections operative to cause forceful relative movement therebetween, a pair of end loading bowls disposed in end to end relation below and lengthwise of the frame, and means mounting said bowls in connection with the frame for movement in longitudinal rigid relation with different ones of said frame sections; said bowls including digging blades on adjacent ends, and each bowl being supported for selective vertical adjustment independently of any vertical adjustment of the other bowl.

4. An earth carrying scraper comprising a frame including a plurality of relatively longitudinally movable sections, power actuated means connected between and arranged to cause forceful relative movement of said sections, a pair of end loading earth carrying bowls corresponding to different ones of said frame sections, means mounting said bowls in connection with corresponding frame sections for movement therewith in longitudinal rigid relation and for relative vertical adjustment, and means operative to selectively vertically adjust each bowl independently of any vertical adjustment of the other bowl.

5. An earth carrying scraper comprising a frame including a plurality of relatively longitudinally movable sections, power actuated means connected between and arranged to cause forceful relative movement of said sections, a pair of end loading earth carrying bowls corresponding to different ones of said frame sections, means mounting said bowls in connection with corresponding frame sections for movement therewith in longitudinal rigid relation and for relative vertical adjustment, and means operative to selectively and independently vertically adjust the bowls; said last named means including a cable extending upwardly from each bowl, a cable drum on the corresponding frame section, the corresponding cable being connected thereto, and a power unit mounted on each of said corresponding frame sections coupled in reversible driving relation to the corresponding drum.

6. An earth carrying scraper comprising a frame including a plurality of relatively longitudinally movable sections, power actuated means connected between and arranged to cause forceful relative movement of said sections, a pair of end loading earth carrying bowls corresponding to different ones of said frame sections, means mounting said bowls in connection with corresponding frame sections for movement therewith in longitudinal rigid relation and for relative vertical adjustment, and means operative to selectively and independently vertically adjust the bowls; said last named means including a cable extending upwardly from each bowl, a cable drum on the corresponding frame section, the corresponding cable being connected thereto, and a power unit mounted on each of said corresponding frame sections coupled in reversible driving relation to the corresponding drum, each power unit embodying an electric motor.

7. An earth carrying scraper comprising a frame including relatively longitudinally movable frame sections, power actuated means arranged to cause forceful relative movement of said sections, supporting structures connected with and depending from different ones of said frame sections in longitudinally spaced relation, a pair of end loading earth carrying bowls mounted on corresponding ones of said structures for movement therewith in longitudinal rigid relation, said bowls being vertically adjustably supported, and means to selectively vertically adjust each bowl independently of any vertical adjustment of the other bowl.

8. An earth carrying scraper comprising a main frame including a pair of relatively longitudinally movable frame sections, one of said sections being adapted for coupling to a tractor, a wheel support depending from the other section, transversely spaced wheels on said wheel support, power actuated means connecting said frame sections operative to cause forceful relative movement therebetween, a pair of end loading earth carrying bowls corresponding to and below the frame sections, means connecting one bowl with the corresponding frame section for movement therewith in longitudinally rigid, but vertically adjustable relation, means connecting the other bowl with the wheel support for movement with said other frame section in longitudinally rigid, but vertically adjustable relation, and means to selectively vertically adjust each bowl independently of any vertical adjustment of the other bowl; said bowls each including a digging blade and said blades being positioned to dig toward each other.

9. An earth carrying scraper comprising a frame having relatively longitudinally movable frame sections, front and rear pairs of wheels supporting the frame, an engine included in the scraper, one pair of said wheels being driven by the engine, power means connected between the frame sections operative to cause forceful relative movement therebetween, said one pair of wheels being driven and the power means being actuated simultaneously or independently, selectively, a pair of end loading earth carrying bowls, means mounting the bowls in connection with different ones of said frame sections for movement therewith in longitudinal rigid relation and for vertical adjustment, and means operative to selectively vertically adjust each bowl independently of any vertical adjustment of the other bowl.

10. An earth carrying scraper comprising a frame having relatively longitudinally movable frame sections, front and rear pairs of wheels supporting the frame, an engine included in the scraper, one pair of said wheels being driven by the engine, power means connected between the frame sections operative to cause forceful relative movement therebetween, said one pair of wheels being driven and the power means being actuated simultaneously or independently, selectively, a pair of end loading earth carrying bowls, means mounting the bowls in connection with different ones of said frame sections for movement therewith in longitudinal rigid relation and for vertical adjustment, and means operative to selectively vertically adjust each bowl independently of any vertical adjustment of the other bowl; said bowls being disposed in end to end relation between the front and back wheels, and said bowls including cutting blades across the bottom at adjacent ends of the bowls.

11. An earth carrying scraper comprising a two-wheel tractor, a main frame coupled in trailing relation to the tractor, said frame including relatively longitudinally movable frame sections, one section being connected to the tractor, separate wheels supporting the frame adjacent its rear end and connected to another of said sections, power actuated means arranged to cause forceful relative movement between the frame sections independently of the tractor wheels or said separate wheels, a pair of end loading bowls between the tractor wheels and said separate wheels, means mounting said bowls in connection with different ones of said frame sections for movement therewith in longitudinally rigid but vertically adjustable relation, and means operative to selectively vertically adjust each bowl independently of any vertical adjustment of the other bowl.

12. An earth carrying scraper comprising a two-wheel tractor, a main frame coupled in trailing relation to the tractor, said frame including relatively longitudinally movable frame sections, one section being connected to the tractor, separate wheels supporting the frame adjacent its rear end and connected to another of said sections, power actuated means arranged to cause forceful relative movement between the frame sections independently of the tractor wheels or said separate wheels, a pair of end loading bowls between the tractor wheels and said separate wheels, means mounting said bowls in connection with different ones of said frame sections for movement therewith in longitudinally rigid but vertically adjustable relation, and means operative to selectively vertically adjust each bowl independently of any vertical adjustment of the other bowl; said bowls loading at adjacent ends and having transverse digging blades across said ends at the bottom.

13. An earth carrying scraper comprising a frame having relatively longitudinally movable frame sections, power means operative to cause forceful relative movement of said sections, a pair of end loading bowls, means mounting said bowls in connection with and dependent from different ones of the frame sections for movement therewith in longitudinally rigid but vertically adjustable relation, said bowls loading at adjacent ends, means to selectively vertically adjust each bowl independently of any vertical adjustment of the other bowl, an end gate in and movable through each bowl, said end gates being normally disposed in opposite ends of said bowls, and means to advance the end gates through the bowls toward said adjacent ends thereof, said last named means being operative in any position of vertical adjustment of said bowls.

14. An earth carrying scraper comprising a frame having relatively longitudinally movable frame sections, power means operative to cause forceful relative movement of said sections, a pair of end loading bowls, means mounting said bowls in connection with and dependent from different ones of the frame sections for movement therewith in longitudinally rigid but vertically adjustable relation, said bowls loading at adjacent ends, means to selectively vertically adjust each bowl independently of any vertical adjustment of the other bowl, an end gate in and movable through each bowl, said end gates being normally disposed in opposite ends of said bowls, and means to advance the end gates through the bowls toward said adjacent ends thereof, said last named means being automatically operative upon predetermined separating movement of said bowls, regardless of the relative position of vertical adjustment of said bowls.

15. An earth carrying scraper comprising a substantially horizontally disposed frame, such frame comprising a front and rear section and an intermediate section, the front and rear sections being each telescopically connected with the intermediate section for independent longitudinal movement relative thereto, a wheeled truck independently supporting each of the front and rear sections, respectively, power operated means interposed between the front and rear sections for effecting forceful longitudinal movement of such frames relative to each other, and a scraper bowl mounted in connection with each of the front and rear sections and movable therewith, the open ends of such bowls facing each other.

16. A structure as in claim 15 in which the power operated means comprises a screw jack unit, one element of which is connected to the front frame section and the other element to the rear frame section, and a reversible electric motor mounted on one of said last named frame sections and connected in driving relation with the corresponding jack element.

17. A structure as in claim 15 in which a load ejecting element is disposed in each bowl for fore and aft movement relative thereto, a rigid guide way projecting to the back of each bowl, a roller carriage movable along each guide way, means connecting each load ejecting element with the adjacent roller carriage, a longitudinally disposed control element connected at each end to one of the roller carriages, such control element comprising two rods overlapping each other at their adjacent ends, there being an eye on one rod through which the other rod slides, and a stop on said other rod engageable with said eye to prevent separation of said rods.

ROBERT G. LE TOURNEAU.

REFERENCES CITED

The following references are of record in the file of this patent:

UNITED STATES PATENTS

| Number | Name | Date |
|---|---|---|
| 443,993 | Henry | Jan. 6, 1891 |
| 684,633 | Fickinger et al. | Oct. 15, 1901 |
| 1,497,505 | Guy et al. | June 10, 1924 |
| 2,422,813 | Walch | June 24, 1947 |